US008090071B2

(12) United States Patent
DeLuze (10) Patent No.: US 8,090,071 B2
(45) Date of Patent: Jan. 3, 2012

(54) APPARATUS FOR HOT FUSION OF FUSION-REACTIVE GASES (75) Inventor: James Robert DeLuze, Honolulu, HI (US)

(73) Assignee: James Robert DeLuze, Honolulo, HI (US)

(*) Notice: Subject to any disclaimer, the term of this patent is extended or adjusted under 35 U.S.C. 154(b) by 1019 days.

(21) Appl. No.: 10/214,372

(22) Filed: Aug. 6, 2002

(65) Prior Publication Data
US 2011/0268236 A1 Nov. 3, 2011

Related U.S. Application Data (60) Provisional application No. 60/311,453, filed on Aug. 8, 2001.

(51) Int. Cl.
G21B 1/00 (2006.01)
(52) U.S. Cl. .......................... 376/100; 376/107; 376/150
(58) Field of Classification Search .................. 376/100, 376/107, 150
See application file for complete search history.

(56) References Cited

U.S. PATENT DOCUMENTS

| 3,258,402 A | * | 6/1966 | Farnsworth | 376/107 |
| 3,609,369 A | * | 9/1971 | Croitoru | 376/108 |
| 4,401,618 A | * | 8/1983 | Salisbury | 376/106 |
| 4,414,176 A | * | 11/1983 | Krauss et al. | 376/136 |
| 4,568,509 A | * | 2/1986 | Cvijanovich et al. | 376/109 |
| 4,654,561 A | * | 3/1987 | Shelton | 315/111.71 |
| 4,698,198 A | * | 10/1987 | Gruen | 376/146 |
| 5,160,695 A | * | 11/1992 | Bussard | 376/107 |
| 5,162,094 A | * | 11/1992 | Curtis | 376/107 |
| 5,659,173 A | * | 8/1997 | Putterman et al. | 250/361 C |
| 5,729,580 A | * | 3/1998 | Millspaugh | 376/114 |
| 7,139,349 B2 | * | 11/2006 | Leung | 376/108 |

OTHER PUBLICATIONS

David Braaten, 'Ridiculously' easy test yields claim of energy triump, The Washington Times, p. A5, Mar. 1989.*
Malcolm W. Browne, 'Fusion' Claim is Greeted With Scorn by Physicists, The New York Times, p. A1 and A22, May 1989.*
Kreysa et al, A critical analysis of electrochemical nuclear fusion experiments, Journal of Electroanalytical Chemistry, vol. 266, p. 437-450, 1989.*
Ohashi et al, Decoding of Thermal Data in Fleishmann & Pons Paper, Journal of Nuclear Sciencec and Technology, vol. 26, No. 7, p. 729-732, Jul. 1989.*

(Continued)

Primary Examiner — Ricardo Palabrica (57) ABSTRACT

A generally spherical sealed reactor vessel defining a volume. A target sphere shaped electrode 11 is centered within a nonconductive reactor vessel 21. The target sphere is insulated from and fixedly centered within the nonconductive reactor vessel by an insulated stalk 22. This vessel is suspended in an insulating and cooling medium 241 composed of transformer oil. Deuterium gas 235 is released into and contained within the volume at a predetermined pressure. A source of high voltage, high frequency potential 130 is connected to the target electrode by an electrical connection 13. The other terminal of the high voltage, high frequency potential source is connected to Earth ground 153. The applied alternating electrical potential creates an alternating electrical field within the reaction chamber. This an oscillating electric field is formed within the enclosed space of nonconductive reactor vessel 21, extending between target electrode 11 and heat absorbent container 238. This electric field is of sufficient intensity to provide for the ionization of gases contained therein. It also provides for the alternately radial outward acceleration and the alternately radial inward acceleration of the contained ionized gases. The collapsing of ionized gases provides for ions impacting the spherical target, and for the impact of ions with one another. The intensity of the electric field is sufficient that such impacts occur at fusion reactive velocities.

20 Claims, 7 Drawing Sheets

OTHER PUBLICATIONS

MisKelly et al, Analysis of the Published Calorimetric Evidence for Electrochemical Fusion of Deuterium in Palladium, Science, vol. 246, No. 4931, p. 793-796, Nov. 1989.*

Lewis et al, Searches for low-temperature nuclear fusion of deuterium in palladium, Nature, vol. 340, p. 525-530, Aug. 1989.*

George Chapline, Cold Confusion, UCRI-101583, p. 1-9, Jul. 1989.*

David Stipp, Georgis Group Outlines Errors That Led TO Withdrawl of 'Cold Fusion' Claims, The Wall Street Journal, p. B4, Apr. 1989.*

G. Horanyi, Some Basic Electrochemistry and the Cold Nuclear Fusion of Deuterium, Journal of Radioanalytical Nuclear Chemistry, Letters, vol. 137, No. 1, p. 23-28, Aug. 1989.*

Faller et al, Investigation of Cold Fusion in Heavy Water,Journal of Radioanalytical Nuclear Chemistry, Letters, vol. 137, No. 1, p. 9-16, Aug. 1989.*

Haides et al, Search for Cold-Fusion Events, Solid State Communications, vol. 72, No. 4, p. 309-313, 1989.*

Ziegler et al, Electrochemical Experiments in Cold Nuclear Fusion, Physical Review Letters, vol. 62, No. 25, p. 2929-2932, Jun. 1989.*

Philip J. Hilts, Significant Errors Reported in Utah Fusion Experiments, The Washington Post, p. A1 and A7, May 1, 1989.*

Associated Press, Panel Opposes Cold Fusion Efforts, The Washington Post, p. A14, Mar. 1990.*

Alber et al, Search for Neutrons from 'Cold Nuclear Fusion', Zeitschrift fur Physik A Atomic Nuclei, vol. 333, p. 319-320, 1989.*

J. F. Cooke, Report of Foreign Travel of J. F. Cooke, Head, Solid State Theory Section, Solid State Division, ORNL/FTR-3341, p. 2-15, 1989.*

Schrieder et al, Search for cold nuclear fusion in palladium-deuteride, Zeitschrift fur Physik B-Condensed Matter, vol. 76, No. 2, p. 141-142, 1989.*

Price et al, Search for Energetic-Charged-Particle Emission from Deuterated Ti and Pd Foils, Physical Review Letters, vol. 63, No. 18, p. 1926-1929, Oct. 1989.*

Cribier et al, Conventional Sources of Fast Neutrons in "Cold Fusion" Experiments, Physics Letters B, vol. 228, No. 1, p. 163-166, Sep. 1989.*

Shani et al, Evidence for a Background Neutron Enhanced Fusion in Deuterium Absorbed Palladium, Solid State Communications, vol. 72, No. 1, p. 53-57, 1989.*

Associated Press, Physicist: Utah Cold-Fusion Gear Doesnt't Work, The Washington Post, p. A3, 1989.*

Salamon et al, Limits on the emission of neutrons, gamma rays, electrons and protons from Pons/Fleischmann electrolytic cells, Nature, vol. 344, p. 401-405, May 1990.*

Wilson, "Hot Sounds", Popular Mechanics, Feb. 1998.*

Putterman, "Sonoluminescence Sound into Light", Scientific American, Feb. 1995.*

Moss et al., "Hydrodynamic Situations of Bubble Collapse and Picosecond Sonoluminescence", Phys. Fluids, vol. 6, No. 9, Sep. 1994.*

Browne, The New York Times, Dec. 1994.*

"Star in a Jar", Popular Science, Dec. 1998.*

L.Crum, "Sonoluminescence and Acoustic Enertial Confinement Fusion", Fifth International Symposium on Cavitation, Osaka, Japan, Nov. 1-4, 2003.*

I. Sample, "Science runs into trouble with bubbles", "The Guardian", Mar. 2004.*

Gordon Pusch (http://www/physics-talk.com/Why-is-acetone-used-jn-sonofusion experiments-6987552.html), May 2004.*

Akiro Takahashi, Osaka University (htttp://wwwcf.elc. iwate-u.ac.jp/jcf/mlist/00042. html), 2001.*

The Chemistry and Industry News, Apr. 21, 1997.*

"Chemistry casts double on bubble fusion", Nuclear News, Sep. 2002.*

Kaiser, "Inferno in a Bubble Turning sound into light poses a tantalizing puzzle", Sceince News, vol. 147, Apr. 1995.*

* cited by examiner

APPARATUS FOR HOT FUSION OF FUSION-REACTIVE GASES

CROSS-REFERENCE TO RELATED APPLICATIONS

This application claims the benefit of Provisional Patent Application Ser. No. 60/311,453, filed 2001 Aug. 8 by the present inventor.

FEDERALLY SPONSORED RESEARCH

Not applicable.

SEQUENCE LISTING OR PROGRAM

Not applicable.

BACKGROUND

1. Field of Invention

This invention relates to hot nuclear fusion reactions of heavy and light Hydrogen and other fusion reactive gases for the production and recovery of energy.

2. Description of Prior Art

Electric illumination supplies a basic need of modern society. To this end, inventors created several types of electric lights. U.S. Pat. No. 514,170 to Tesla (1894), which is hereby incorporated by reference, discloses a partially evacuated, bulb shaped glass enclosure with a central target. This central electrode is attached by a stalk containing an electrically conductive element. The conducting element is attached to a source of high voltage, high frequency electrical potential. This alternating potential ionizes and then alternately attracts and repels the positive ions of rarefied gases present in the bulb. These ions reach such speeds, that the central refractory electrode, due to the force of impact of these high speed ions, glows incandescently, becoming a source of light. This starts occurring at frequencies of 20 KHz (thousand Hertz) and above, and at potentials of 20 kV AC (thousand volts alternating current) and above.

A reliable source of power supplies a basic need of modern society. To this end, inventors created several types of nuclear reactors. U.S. Pat. No. 3,530,497 to International Telephone and Telegraph Corporation (1970), U.S. Pat. No. 3,258,402 to Farnsworth (1966) and U.S. Pat. No. 3,386,883 to Farnsworth (1968), which is hereby incorporated by reference, collectively describe the "Farnsworth fusor." The "Farnsworth fusor" utilizes the phenomenon of electrostatic confinement of ionized gases as its principle mode of operation as a controlled nuclear-fusion reactor. These reactors are limited to cylindrical, spherical, or toroidal vessels. These reactors have control grids. These reactors have a cathode. These reactors depend upon thermionic emission. These reactors have ion guns. These reactors utilize direct currents as their principle drive potential. These reactors function with internal electrodes. These electrodes are therefore exposed to the extreme heat generated by the reaction. This results in decreased reliability since these vital structures are close to the reaction and are detrimentally affected by the extreme levels of heat generated by nuclear reactions. The varied reactor shapes available to the "Farnsworth fusor", and the internal structures required for it's operation, limit the efficiency of energy transfer from the nuclear-fusion reaction to the power absorption medium.

BACKGROUND OF THE INVENTION

The invention relates to particle acceleration and neutron tubes. My study of sonoluminescence or bubble fusion, lead to my conceiving of the idea of developing an apparatus in which the theory of raising the temperature and pressure of a plasma for the generation of fusion reactions is abandoned. In it's place is a means of generation of fusion reactions which is solely dependent upon particle collision velocity. High temperatures and momentarily high pressures do occur during the operation of this device. But, high temperature and pressure are not the operational determinants of this invention's operation. They are secondary results of it's operation only. The primary operational determinant is particle collision velocity. Sufficient particle collision velocity is obtained by the acceleration of particles to sufficient velocities which generate collision velocities sufficient for fusion reactions to occur. This invention is a particle accelerator and is not a confinement reactor. It is novel in that it utilizes alternating potential acceleration in order to produce a particle motion pattern in which particles alternately collide with a target, resulting in fusion, and then are alternately accelerated away from the target stopping the fusion reactions. Such an on off nature of the device provides many advantages as will be described in this application. Previous references to a collapsing bubble were purely analogies used to explain the expanding and collapsing nature of this particle movement. As indicated above, the understanding of the nature of this invention was first understood by me while studying sonoluminescence. In the "bubble" analogy I found a convenient means of attempting to portray the particle movements of this invention. That I should use such a description should be understood in the light that my inspiration for this invention came while studying such bubble behavior. What became very apparent to me at that time was the importance of dropping the concern over the raising of plasma temperature and pressure as done in confinement processes. These processes mimic the conditions of the core of the Sun. It became obvious that such attempts are futile here on Earth. The Sun's great mass and gravitational fields make such operation applicable to such a region. The conditions on Earth make such operation inherently inefficient. This invention rectifies this situation by solely applying it's operational energy to the ionization and subsequent acceleration of the contained particles and ions. It becomes efficient by not wasting energy on increases in plasma temperature and pressure, parameters not directly related to fusion. This device is a radially and axially concentric, alternating potential neutron tube. Previous references to other processes were no more than word pictures used in an attempt to describe the operation of this device. This device does not use actual sonoluminescence, imploding bubbles, or cavitation phenomenon. Such earlier references were word picture analogies only. It is also important to realize that with this invention I discard confinement theory and it's reliance on compression to temperatures needed to achieve nuclear reaction. This invention also does not rest upon theories of bubble cavitation or sonoluminescence. The observed fact that these processes do not achieve sufficient temperatures for temperature dependent fusion reaction processes is not relevant to this invention. This device is solely velocity dependent. It is not temperature or pressure dependent.

Nikola Tesla patented an "Incandescent Electric Light" on Feb. 6, 1894, U.S. Pat. No. 514,170, which is hereby incorporated by reference. This patent discloses an evacuated, bulb shaped glass enclosure with a central target. This target is connected to one terminal of a high voltage, high frequency alternating current AC power supply. The other terminal of the power supply is connected to earth ground. The alternating potentials generate an alternating electric field emanating outward from the target. This field ionizes and accelerates ions to and from this target at high speeds. At sufficient voltages, these impacts cause the central target to glow incandescently.

Tesla's apparatus functioned as a source of light. My invention is a modification of this apparatus so that it may function as a fusion reactor. At radio frequency, RF, the effective ground point on Tesla's device is at the outer layer of the glass envelope. As a result, the outermost point of the contained electric field assumes the shape of this envelope. The asymmetry of the resultant electric field did not sufficiently hamper the device's function as an electric light. However, such asymmetry of the electric field would lead to inadequate focus of the ions onto the central target electrode for fusion reactions to occur. Additionally, location of RF ground at the outer surface of the envelope also allows for internal arcing between the central target and the inner surface of the envelope. Such arcing takes the form of the plasma filaments commonly seen in such devices which today are referred to as plasma lamps. Such arcing is visually pleasing in a lighted lamp, but would prevent the device from producing reliable fusion reactions. Additionally, Tesla's device contained an inner conductive sleeve extending over the insulated stalk, proceeding along this stalk and in contact with the target electrode. This sleeve would further interfere with the electric field symmetry rendering the device in operable for fusion reactions. Tesla's device includes no provisions for reactor cooling or from insulation from heat released within the energy absorber jacket. Tesla's device includes no provisions for the introduction or removal of contained gases. Tesla's device provides for a conceptual model for this invention. But significant modifications and changes were needed to transform this concept from a light bulb into a fusion reactor.

Applications include a power source and a neutron source. Neutron sources are used in radiography, nuclear devices, medical treatments, and in various measuring devices.

SUMMARY

The invention is a spherical fusion reactor with a central target electrode. A spherical, insulated envelope contains a concentrically located spherical target electrode. This envelope contains rarefied fusion reactive gas. The envelope is suspended in an insulating and cooling medium. This medium is contained within a thermally insulated container. This container is suspended within an energy absorbing medium held within another container. A source of high voltage, high frequency alternating potential is connected between the central target electrode and earth ground.

A Deuterium (or Deuterium and Tritium, D-T) ion plasma is produced within this envelope by electric fields present between the target and the ground plane. This field is present when the target is at a different electric potential with reference to the ground plane. The intensity of this field is in proportion to the potential difference between the target and the ground plane. The direction of this field is determined by the relative charge polarities between the target and the ground plane. With reference to a positive ion, with a positive charge on the target and a negative charge on the ground plane, the electric field direction would be such that a positively charged particle would move radially outward from the target. With a negative charge on the target and a positive charge on the ground plane, a positively charged particle would move radially inward toward the target. The rate of acceleration of a charged particle within this field is in proportion to the intensity of this field. The intensity of this field is in proportion to the potential difference between the target and the ground plane. With an alternating potential placed between the target and the ground plane, an electric field varying in intensity and polarity is produced. The maximum intensity is proportional to the peak voltage applied. As the potential difference is rising, the electric field intensity is increasing. The electric field intensity becomes sufficiently intense for electric field ionization. Once ionization occurs, the positive and negative ions are accelerated in opposite directions. The alternating potential applied is of such a magnitude that it has not reached it's peak value at the point of ionization. The intensity of this potential continues to increase until the field reaches such intensity that sufficient particle acceleration for fusion reactions to occur is produced. It is during the polarity of alternation in which inward acceleration of positive ions occurs, that these ions are accelerated with fusion reactive velocities to the central target. These particles impact with the target and each other with velocities sufficient for fusion. These fields change in polarity with the polarity potential changes of the alternating current. The ions within this enclosed space alternately accelerate inward to the target electrode, and alternately accelerate outward toward the envelope. The spherical target electrode is suspended from the envelope by an insulated stalk. When the target electrode is biased negative, with respect to earth ground, ions within this enclosed space accelerate to the target electrode producing D-D or D-T reactions. The target is loaded with D or T by the impact of the D or T ions.

Envelopement of the reactor envelope within an insulating cooling medium provides for cooling of the reactor and isolates the reactor chamber from RF ground potential. This permits a uniform equipotential surface to be developed along the inner lining of the reactor envelope. This surface is spherical and concentrically aligned with the central target electrode. This produces a uniformly spherical electric field within the reactor envelope. This allows the electric field to focus the ions onto the target when they are accelerating inward to the target. The electric fields must be symmetrical in order to allow for fusion reactions to occur at the target. RF ground potential must be sufficiently removed from the outer surface of the reactor envelope for reliable functioning. This design provides for the removal of the RF ground potential location to be located external to the thermally insulated container holding the insulating and cooling medium. In some embodiments, this RF ground potential location may also be located externally more distant from this point. Electrical insulation of the internal and external surfaces of the reactor envelope from RF ground provides for uniformly symmetrical electric fields within the reactor chamber.

Envelopement of the reactor insulating and cooling medium within a thermally insulated container provides for the outward transport of energy radiations with restriction of inward passage of heat energy. This reduces the thermal load of the reactor and the contained insulating and cooling medium from reabsorption of heat produced within the absorber medium.

This invention provides a highly controllable and efficient hot fusion reactor. AC drive current provides for both ionization and target impact. The cyclic on of nature of this inventions operation allow fine power increment control and the means for both introducing and extracting gases to and from fusion reactions. Fine power control is obtained by the fact that the reaction is turning on and off at a high rate. Duty cycle and pulse control allow the number of reactions per given time period to be varied. In example, if the drive frequency is 50,000 Hertz, the net power output of the system can be varies in 1/50,000 per second increments by varying the number of alternations per time period in which the applied potential is of sufficient intensity to permit fusion reactions. Introduction and extraction of gases can be accomplished during and after the portion of alternation in which positive ions are accelerated outward. Control of the waveform can also let the electric field be momentarily ended in order to facilitate electron and ion recombination. Gas injection and extraction can take place during these time periods. Most significantly, the alternation polarity nature of the drive potential provides a time means in which portions of time where the central reacting mass is disassembled. This is subsequently followed by radial acceleration of ions outward providing for a time in which gas exchange may occur. All the prior art with regards to particle acceleration and neutron tube fusion reactors do not involve reversal of particle direction as does this invention. Such devices work, but work only as one shot devices. It can operate on both the D-D and the D-T reactions. The presence of a physical target limits power levels to those levels within which the target will survive.

DETAILED DESCRIPTION OF THE INVENTION

Figure 1:
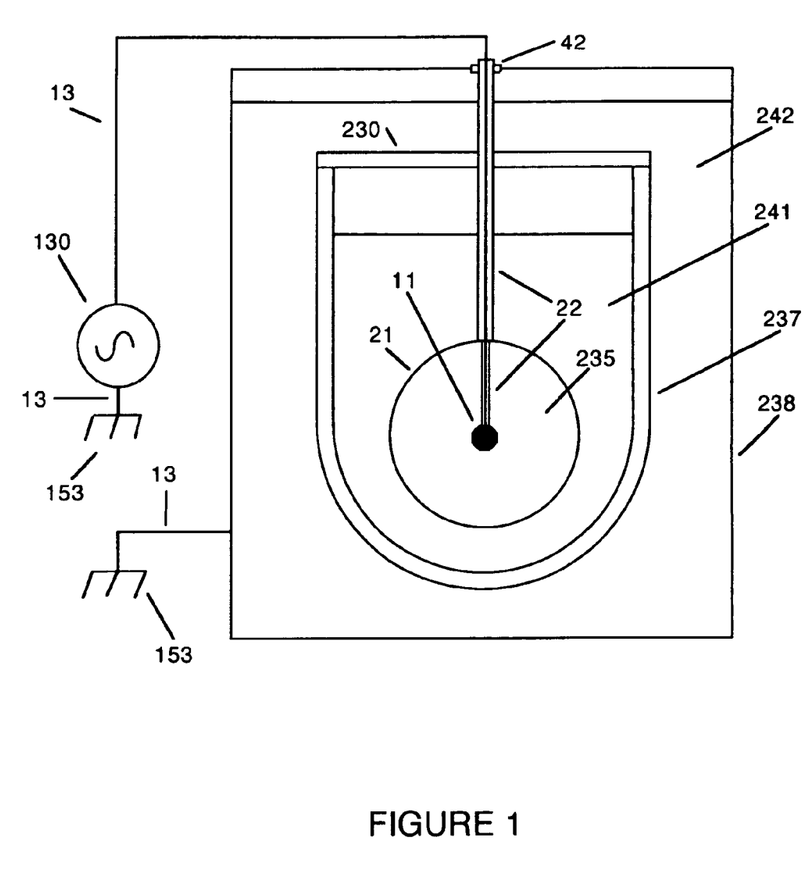
FIG. 1 is a cross sectional view of a spherical fusion reactor of this invention. It includes the reactor and it's target, the insulating and cooling medium, the radiation absorber with it's container, and the power supply and it's connections.

FIG. 1 shows a non conducting spherical reactor envelope 21 having an internal insulated stalk 22 extending centrally from which a spherical target electrode 11 is located centrally, coaxially, and fixedly within envelope 21. An open space is defined between spherical electrode 11 and the inner surface of spherical envelope 21. This defined space contains rarefied Deuterium gas 235. This gas 235 may also consist of Tritium, or mixture of Deuterium and Tritium, or any other fusion reactive gases. This space also provides a location for the generation of an alternating electric field.

This alternating electric field provides for the ionization of gases contained therein. It also provides for the alternately radial inward acceleration and the alternately radial outward acceleration of ionized gases contained therein. The collapsing of ionized gases provides for ions impacting the spherical target, for the impact of ions with one another, and for such impacts to occur at fusion reactive velocities. The outward radial acceleration of ionized gases provides for a gas distribution allowing for gas extraction from the enclosed space and for a gas distribution allowing for gas introduction into the enclosed space. The fusion contained gas is at a predetermined pressure from 0.00000001 Torr and 760 Torr, preferably from 0.0001 to 1 Torr, in particular about 0.01 Torr.

The spherical envelope of insulating material 21 enclosing a space provides for the following: a sealed space containing gas at a predetermined pressure, an insulating surface providing a location for the stopping of the outward movement of electrons, a location of a equipotential of electric charge accumulation, and the development of a spherically symmetrical electric field.

Envelope 21 is suspended within insulating and cooling medium 241 by a second insulated stalk 22 which passes through insulated cap 230 and insulating feedthru 42. Insulating and cooling medium 241 is contained within thermally and electrically insulated container 237. Insulated container 237 is suspended within radiation absorber and cooling medium 242 which is contained by heat absorbent container 238. Insulated container's 237 partial radius is concentrically centered on spherical target 11 and spherical envelope 21.

The insulating and cooling medium 241 separates and distances RF, radio frequency, ground potential from locations: within the reactor chamber, along the inner surface of the reactor chamber, along the outer surface of the reactor chamber, and to places external to the thermally and electrically insulated enclosure. This separation and distancing of the RF ground potential provides for: a symmetrically developed field within the reactor, an electric field of evenly developed intensity radially outward from the target, the prevention of internal arcing, and the reduction of capacitive reactance loading of the power supply.

High voltage, high frequency alternating current source/power supply 130 is connected by wire 13 between ground potential point 153 and spherical target electrode 11. Heat absorbent container 238 is also connected by wire 13 and ground potential point 153.

In the present embodiment target 11 is Titanium, wire 13 is copper, envelope 21, stalk 22, and feedthru 42 are made of glass. Internal insulated stalk 22 is radiused to permit a tight fit with spherical target electrode 11. Insulated cap 230 and container 237 are made of double layered glass with a vacuum insulation as per standard practice of those experienced in this art. Heat absorbent container 238 is steel. Insulating and cooling medium 241 is transformer oil. Radiation absorber and cooling medium 242 is water. Gas 235 is Deuterium. Power supply 130 and ground potential point 153 are per standard practice of those experienced in the art.

Inside the surrounding envelope 21 is spherical target 11. Target 11 is the site of nuclear reactions and provides a surface: for ions impacting the spherical target, for the impact of ions with one another, and for such impacts to occur at fusion reactive velocities. Target 11 may also be composed of other materials capable of permitting and surviving nuclear reactions. AC potential applied between the target 11 and ground 153 produce an alternating electric field within. Typically, about 100 KV, kilovolts, RMS, root mean square, to 150 KV RMS is to be placed between the inner surface of envelope 235 and the surface of spherical target 11. This is the net voltage between these points. There will be a voltage drop through envelope 21 and the ground potential point 153. This additional voltage drop will vary as a result of the AC potential frequency and the makeup of the intervening structures. This will vary with the differing embodiments of this invention. The potential provided by power supply 130 is at a predetermined voltage from 10 KV AC RMS to 25,000,000 AC RMS, preferably from 50 KV AC RMS to 500 KV AC RMS, in particular from 100 KV AC RMS to 250 KV AC RMS. This potential is at a predetermined frequency from 60 Hertz to 1,000,000 Hertz, preferably 10,000 Hertz to 100,000 Hertz, in particular from 20,000 Hertz to 50,000 Hertz.

Using an example of 100 KV RMS, factoring for the internal resistance losses of the power supply and adding a 50 percent safety factor, the puncture breakdown of the insulating medium 241 should be about 840 KV. The transformer oil of this embodiment has a puncture breakdown of about 50 KV per millimeter, mm, at 60 Hz. This comes to about 1.7 cm, centimeters. A thickness of 10 cm should be entirely adequate. With the net operating voltage of the reactor being 100 KV RMS, the power supply should put out 200 KV RMS for peak efficiency of energy transfer.

Insulating and cooling medium 241 is a major functional change in order to make this invention function as a nuclear reactor. All previous devices have the earth ground point 153 within the reactor chamber, at the reactor chamber itself, or along the outer surface of the reactor chamber. This will function adequately at DC, direct current, potentials. However, because of the characteristics of AC potentials, this will not reliably work at AC frequencies. Functioning becomes even more difficult as the frequency of the AC increases. I will briefly recite these problems. They are addressed and resolved by the insulating and cooling medium 241 and by the concentrically and spherically placed relationship between spherical target electrode 11 and the spherical inner surface of insulated envelope 21. This invention can also work with shapes other than spheres, such as toroids, cylinders, and spiral helix shapes. But the symmetrical relationship between a given reactor envelope and it's correspondingly shaped target electrode must be maintained for operation as a fusion reactor. Fusion requires the overcoming of intense near inter particle repulsive forces as the particles collide. This requires an evenly and symmetrically developed electric field between the target electrode and the inner surface of it's containing envelope. Electric field asymmetry and variation will allow for scattering, rather than collision of particles. Lack of fusion would be the result. Sufficient impact for incandescence of the target may permit illumination, but it would prevent fusion.

Removal of RF ground potential from beyond the outer surface of insulated reactor envelope 21 to the outer surface of insulated container 237 or beyond permits the development of a nearly equal potential difference point along the inner surface of insulated reactor envelope 21. As a result, a symmetrical electric field will develop in the enclosed space between the target electrode 11 and the inner surface of the reactor envelope 21. Focus of ions onto the surface of the target electrode is the result. Worked results later presented on a example embodiment of this invention indicate at 50 KHz about 99.99 percent of the applied AC potential appears between the inner surface of spherical reactor chamber 21 and target electrode 11. This is about 0.01 percent voltage variation within this electric field. Without insulating and cooling medium 241 this would be impossible. Suspension of such a device within an atmosphere conductive at RF frequencies would lead to considerable voltage variation along both the outer and inner surfaces of insulated spherical envelope 21. The result would be internal arcing and the formation of plasma filaments short circuiting the potential difference between these locations. The presence of increasing amounts of capacitive reactance with increasing frequency of AC potential would sufficiently load down the power supply to make practical delivery of sufficient acceleration voltage at reasonable power levels impossible. Conductance of AC through this capacitance would also cause overheating. It would result in the target electrode to have to dissipate more power than the resultant fusion reactions would be permitted to produce. Such a device would consume more drive power than energy produced. This is permitted when the device is operated as a neutron generator or source. It precludes operation of the device as a net producer of energy.

Another advance in this invention is the enclosure of the insulating and cooling means 241 within a thermally insulated container 237. This permits the outward radiation of power, particulate radiations, and waveform radiations, but restricts the inward movement of heat energy released within the absorber medium 242 from moving backward into the reactor thereby increasing it's heat loading. It provides for the absorption of emitted radiations from the reactor. This allows for: the harnessing of said radiations to do work, the shielding of the external environment of the reactor from radiations, and the cooling of the contained reactor and it's associated internal components.

Target 11 is the location of fusion reactions. A varying and polarity reversing electric field is formed between this centrally located target 11 and the inner surface of spherical envelope 21. This field will be evenly distributed and symmetrical. On both alternations, at sufficient potential, the enclosed rarefied Deuterium gas 235 is ionized. After ionization, the gas is either accelerated to the envelope 21 or to the target 11 depending on the given polarity of the field at that instant. On inward passage of the ions, generally with potentials exceeding 100 KV to about 150 KV, the ions impact with each other at the target surface with fusion reactive velocities. Considering application of 141 KV peak AC applied at 50 Khz, the duty cycle of the instantaneous potential exceeding 100 KV is about 25 percent. These voltages can be scaled up or down for given operational considerations. The Deuterium gas 235 is at a pressure of about 0.01 Torr. Prior to operation, the reactor is evacuated and is then baked without, and then with Deuterium gas present. This is to cleanse the contents of contaminant gases. The reactor is placed into operation. Deuterium gas 235 is delivered at the proper pressure and the reacted gases are removed by associated plumbing apparatus, not described. The gas alternately ionizes and impacts the target electrode 11 resulting in fusion reactions. The polarity reverses and the gas deionizes. The gas is then reionized and is propelled outward to the reactor envelope 21. This is the operational principle of this invention.

The alternating electric field provides for a continuos on off nature of the reactions, and for the alternating radial inward and then radial outward acceleration of the contained gas. These principals allow for reaction stability, controllability, safety, and the ongoing injection and extraction of fuel and waste gases to permit continuos ongoing operation.

The operational embodiment of this invention is applicable to power production and neutron production. The physical target version of this invention limits the device to given power levels. The following worked embodiment has a 1 cm target electrode diameter. Such a device can dissipate no more than about 250 watts. This example is for demonstration and calculating purposes only. Up scaling of the target electrode to 10 cm allows of about 25 KW, kilowatts, 20 cm of about 100 KW, and 50 cm of about 628 KW. These power levels can be further increased by placing cooling passages within the target electrode. Such modification would be a future improvement of this basic invention. As part of another patent application, the target electrode 11 is replaced by a virtual target representing a point in space. Such a device could easily operate within megawatt power levels. This invention is also able to operate with other shapes such as toroids, cylinders, and helixes. Gases other than straight Deuterium may be used, such as Tritium, Deuterium Tritium mixtures, and other fusion reactive gases. Catalyst gases such as Methane or Deuterane may be used to increase efficiency.

Figure 2:
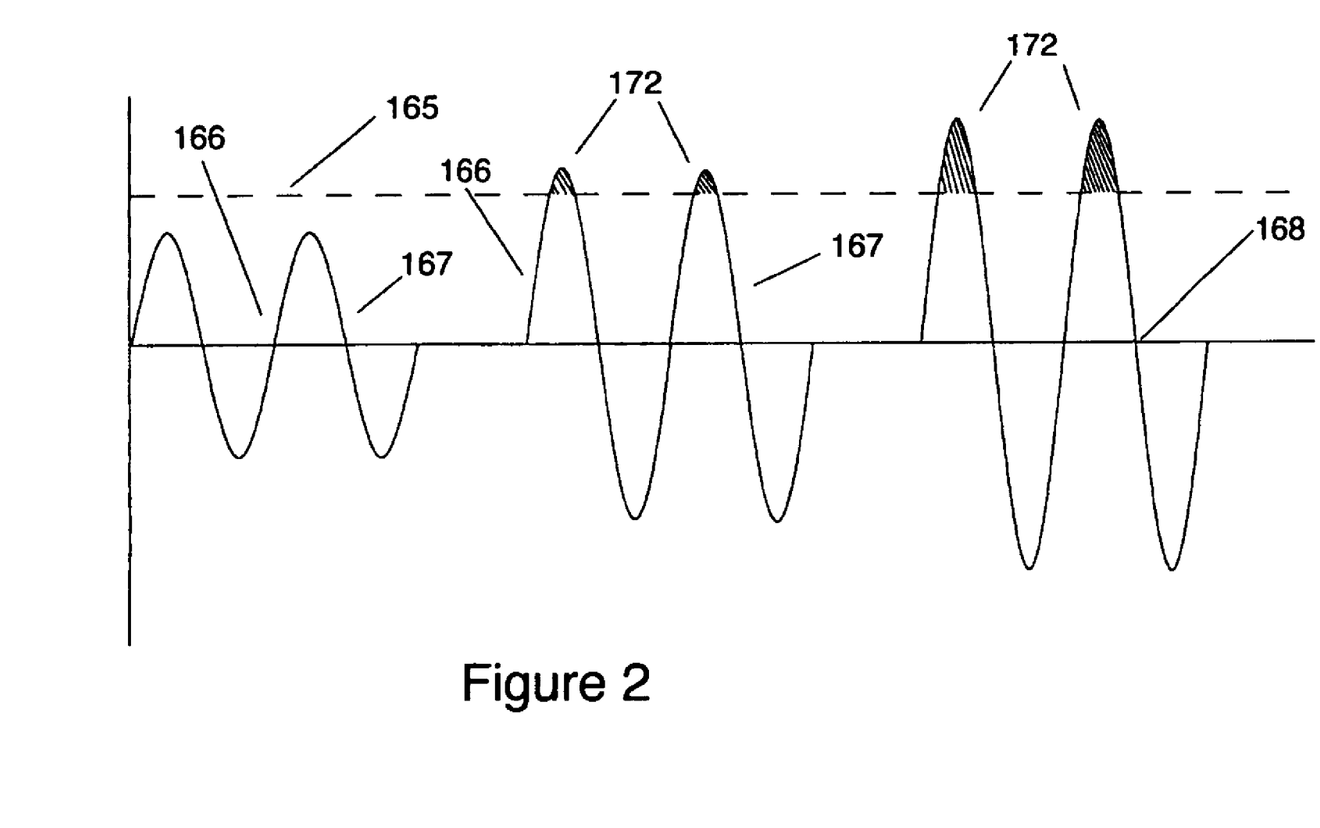
FIG. 2 shows a representation of the an alternating sine wave potential as used by this invention as described herein.

FIG. 2 shows representations of sine wave potentials with amplitude increasing from left to right. The upsweep of the sine wave curve is represented by 166. A fusion threshold is shown at 165. Potentials above this magnitude cause fusion as indicated by portions of the curve 172. The down sweep of the sine wave curve is represented by 167. The change of polarity is represented by 168. The action of this alternating potential is detailed in the last drawings of 4-7.

The next five FIGS. 3 through 7 will be discussed together. They show the same arrangement of layers as built. However, they show the functional changes as a negative potential is placed upon the target electrode. Shown is the subsequent ionization of the contained gas. This continues with the differential acceleration of charged particles. The formation of a new capacitor in the reactor. The charging of this new capacitor. The formation of a capacitive voltage divider. The increased acceleration of positive ions. All of this occurs during the negative alternation and occurs before the peak potential of the negative alternation is reached. This represents less than the first 90 degrees of an AC alternation.

On the application of the subsequent reverse alternation, the reverse occurs. This is not detailed, for it does not illustrate the particle acceleration resulting in nuclear reactions. But what does happen is the stopping of the nuclear reactions and the disassembly of the central reacting mass. The positive ions are accelerated outward to the reactor envelope. They transfer energy to the reactor envelope upon impact. This becomes one of the means of transport of energy out from the reaction center.

Figure 3:
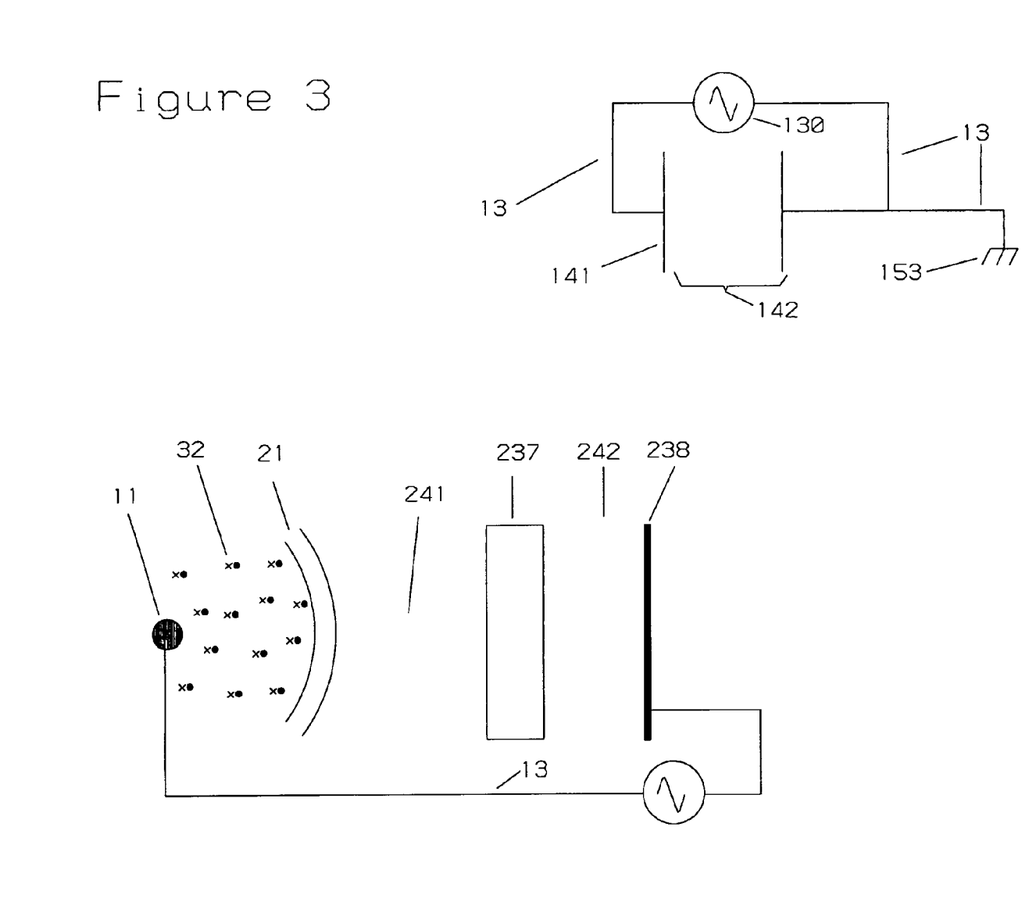
FIG. 3 shows a partial cross section of a spherical reactor and central target electrode and the intervening material between this reactor and ground potential. It shows the conductive and non conductive layers which form a capacitive voltage divider across the power supply. This figure represents a the time period within an AC voltage potential in which no potential is produced by the power supply.

FIG. 3 shows a partial cross section of a spherical reactor and central target electrode and the intervening material between this reactor and ground potential. It shows the conductive and non conductive layers which form a capacitive voltage divider across the power supply. It includes a schematic representation of the capacitance across the power supply. At this instant in time no voltage is applied by the power supply. The representations in the following figures are basically the same excepting for the changes made as a result of the power supply applying an increasingly negative potential between the target electrode and ground potential.

Figure 4:
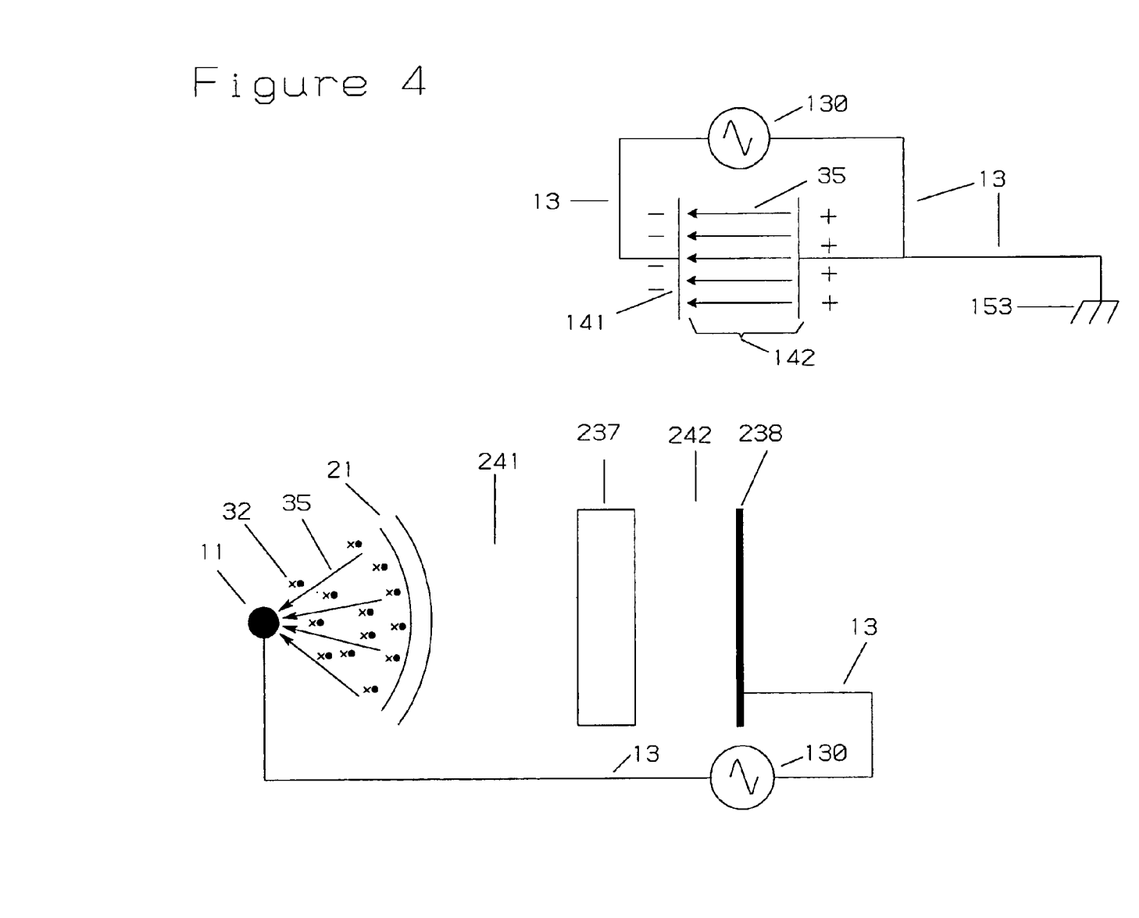
FIG. 4 shows a partial cross section of a spherical reactor and central target electrode and the intervening material between this reactor and ground potential. It shows the conductive and non conductive layers which form a capacitive voltage divider across the power supply. It represents a point in time prior to ionization of the gas within the reactor.

FIG. 4 represents the time period when an initial negative voltage is applied to the target electrode. It shows an electric field within the reactor chamber which is becoming a capacitor. This time is represented as the initial part of the up sweep of the sine curve shown as 166. The electric field has not reached sufficient intensity to ionize the contained gas.

Figure 5:
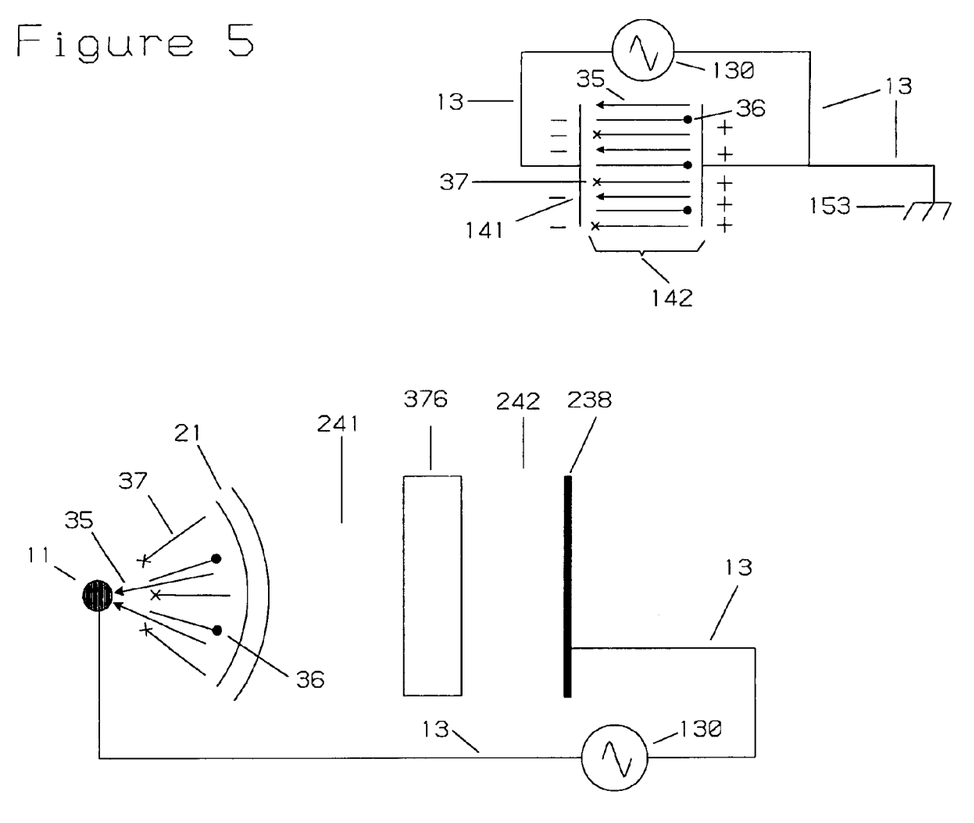
FIG. 5 shows a partial cross section of a spherical reactor and central target electrode and the intervening material between this reactor and ground potential. It shows the conductive and non conductive layers which form a capacitive voltage divider across the power supply. It also includes a schematic representation of the capacitive voltage divider. It represents a time period after initial ionization of the gas within the reactor.

FIG. 5 represents a time period after initial ionization of the gas within the reactor. In time it is still during the sine wave up sweep shown at 166, but it is at an increased intensity at a latter time during the cycle. It shows the initial differential acceleration of charged particles. Positively charged particles are accelerated radially inward towards the target electrode. Negative electrons are accelerated radially outward towards the reactor vessel envelope. A net current flows through the capacitor at this time. This current is composed of positive ions moving inward and electrons moving outward.

Figure 6:
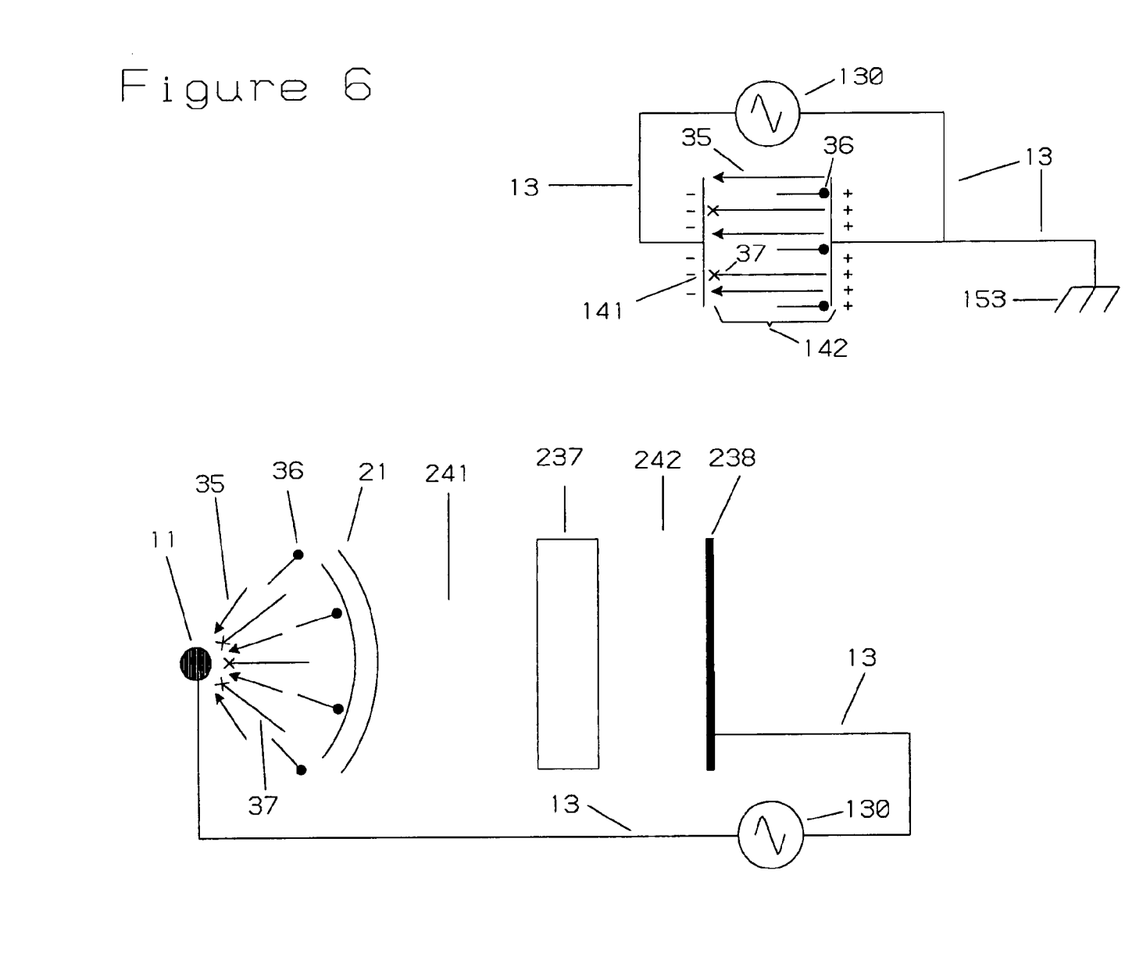
FIG. 6 shows a partial cross section of a spherical reactor and central target electrode and the intervening material between this reactor and ground potential. It shows the conductive and non conductive layers which form a capacitive voltage divider across the power supply. This figure represents a the time period within an AC voltage potential in which the power supply continues to provide a further increasing negative potential to the target electrode. It also represents a time period in which some of the electrons have reached and stopped at the inner surface of the reactor envelope.

FIG. 6 represents a the time period in which the power supply continues to provide a further increasing negative potential to the target electrode. It represents a time in the cycle shifted right from that time in FIG. 5. It still is during the up sweep region 166. Some of the electrons have reached and stopped at the inner surface of the reactor envelope. This represents a decrease in current through this capacitor forming within the reactor. The electrons collecting at the inner surface of the envelope begin to form the plate of this new capacitor within the reactor. The inward proceeding positive charges continue to increase in velocity at this time.

Figure 7:
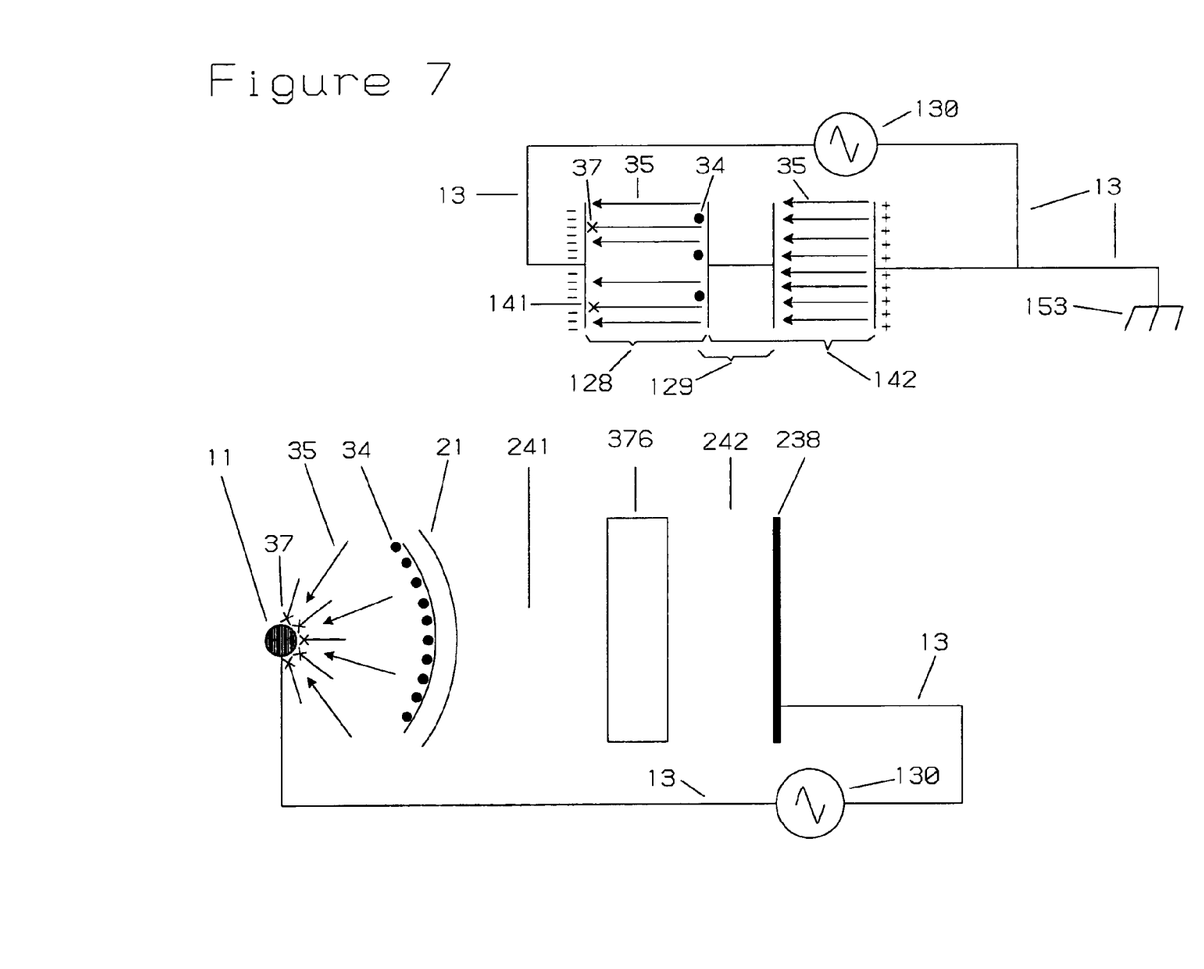
FIG. 7 shows a partial cross section of a spherical reactor and central target electrode and the intervening material between this reactor and ground potential. It shows the conductive and non conductive layers which form a capacitive voltage divider across the power supply. It also includes a schematic representation of the capacitive voltage divider. This figure represents a the time period within an AC voltage potential in which the power supply continues to provide a further increasing negative potential to the target electrode. It represents a time period in which the voltage between the inner layer of the reactor envelope and the central target electrode reaches an intensity such that the positive ions are accelerated to the target with fusion reactive energies and velocities.

FIG. 7 represents a the time period within an AC voltage potential in which the power supply continues to provide a further increasing negative potential to the target electrode. It represents a time within the cycle represented by region 172 through the cycle peak amplitude. All of the electrons have stopped at the inner lining of the reactor envelope. These electrons form the plate of a capacitor within the reactor. At this time the current flow through this capacitor is at a minimum. The capacitor is charging with increasing potential difference across it's plates. This capacitor is in series connection within the capacitive voltage divider between the terminals of the power supply. A portion of the total power supply output potential is now across this capacitor within the reactor. The magnitude of the voltage across the new capacitor 128 within the reactor is in reverse relationship to that capacitor's value of capacitance with respect to the total capacitance of the voltage divider. The plates of this capacitor consist of the target electrode centrally and the electron layer peripherally. The increasing negative potential charges this capacitor to higher and higher potentials as the negative alternation continues to increase in intensity. The central target electrode is negative with respect to the outer plate of this capacitor formed by the electrons stopped at the inner layer of the reactor envelope. As the power supply continues to provide an increasing potential, the voltage between the inner layer of the reactor envelope and the central target electrode reaches an intensity sufficient to accelerate the positive ions to the target with fusion reactive energies and velocities.

Once the crest of the peak electric field intensity passes during region 172, fusion continues for a period of time due to particle inertia acquired during acceleration. Inward acceleration actually continues during the down sweep of the sine wave curve at 167. The amount of inward acceleration becomes progressively less to where the forces of mutual repulsion predominate and the assembled reacting mass begins to disassemble.

All inward acceleration ceases by polarity change point 168. During the next 180 degrees of the sine wave cycle, the process repeats, but with opposite effects. Electrons are accelerated inward and positive ions are accelerated outward. This cycle repeats over and over as driven by the repetitive oscillation nature of the drive potential.

EMBODIMENT OF THE INVENTION

The operational embodiment of this invention is a worked example of how this invention functions. A small 250 watt device is presented. This device operates with a power gain of about three which is very good for fusion power sources. But increased efficiencies can be expected on upsizing this example. It is given is to demonstrate the utility of this invention.

This 250 watt device consists of a Titanium target spherical electrode of 1 cm in diameter. It is in a glass envelope which has an inside diameter of 21 cm. It contains Deuterium gas at a pressure of about 0.01 Torr. It is within a vacuum insulated flask with an inside radius of 41 cm containing transformer oil. The capacitance between the internal electrode and the inner surface of the envelope is about 0.03 picofarads, which will be referred to as C1. The capacitance between this surface and a RF ground located at the outside of the insulated flask is about 26 picofarads, and is referred to as C2. The capacitive reactance of C1 is about 106 million ohms at 50 Khz. The capacitive reactance of C2 is about 122 thousand ohms at 50 KHz. The AC potential applied is 100 KV RMS. Peak operational current is about 2.96 ma, milliamps. The net duty cycle where the instantaneous applied voltage is to the target is 100 KV or greater with respect to ground is about 25 percent.

The device will be operated at an average power of 250 watts. This corresponds to about 80 watts per square cm of target electrode. This is the operational parameters for a Tungsten cathode operating in a vacuum tube. This is taken from "Electron Tube Design," by the Electron Tube Division of Radio Corporation of America, a privately issued edition for internal use by employees, first printing 1962, which is hereby incorporated by reference.

There are no figures available for Titanium. It is assumed that the thermal qualities of Titanium will approximately equal or exceed that of Tungsten. At 80 watts per square cm, the electrode will be at a temperature of about 2600 degrees Kelvin and have an operational life of about 10,000 hours. The heating due to ion impact is about 23.5 watts per square cm for a total of about 75 watts. Operating at 80 watts per square cm is about 250 watts total power output, with 75 watts input. This represents a power gain of about 333 percent. This is a significant increase over the 105 to 110 percent recently obtained with other fusion reactors. The device can operate at a reduced power level even at higher power gain levels. It can be also upscaled for better efficiency.

In the descriptions above, the reader has seen several embodiments of my invention. There are differing applications for these reactors. One example is a fixed power plant for the generation of electricity. Another example is a portable reactor part of a jet engine powering an aircraft. These very different applications make best use of differing embodiments of my invention.

In the descriptions above, I have put forth theories of operation that I believe to be correct, such as the way charged particles move in the reactor. While I believe these theories to be correct, I don't wish to be bound by them. While there have been described above the principals of this invention in connection with specific apparatus, it is to be clearly understood that this description is made only by way of example and is not as a limitation to the scope of the invention.

I claim:

1. A spherical fusion reactor, comprising:
    a spherical solid target formed of a material that is disposed to provide an impact surface for fusion reactions of ions impacting the outer surface of this target and,
    a spherical shell of insulating material enclosing a space coaxially centered upon the centrally located target electrode and,
    an electrically insulated stalk suspending said spherical target fixedly and concentrically within said spherical shell and,
    a rarefied fusion reactive gas contained within spherical shell and,
    an insulating and cooling medium within which the spherical shell is suspended and,
    a thermally and electrically insulated enclosure whose partial radius is concentrically centered on spherical target and spherical shell containing said insulating and cooling medium and,
    a radiation absorbing and cooling medium within which said thermally and electrically insulated enclosure is suspended and,
    a heat absorbent container for containing said radiation absorbing and cooling medium and;
    a high voltage, high frequency alternating current, AC, power supply and,
    electrical interconnections for connecting said high voltage, high frequency AC power supply between the spherical solid target and earth ground.

2. The spherical fusion reactor of claim 1 wherein the spherical solid target is a titanium sphere which provides an impact surface for fusion reactions.

3. The spherical fusion reactor of claim 1 wherein the spherical solid target is composed of a material capable of permitting and surviving nuclear reactions.

4. The spherical fusion reactor of claim 1 wherein the enclosed space is defined as a space between the central spherical target and the inner surface of the enclosing spherical electrically insulated envelope.

5. The spherical fusion reactor of claim 4 wherein the defined space provides a location for the generation of an alternating electric field.

6. The spherical fusion reactor of claim 5 wherein the alternating electric field provides for the ionization of gases contained therein.

7. The spherical fusion reactor of claim 5 wherein the alternating electric field provides for the alternately radial outward acceleration and the alternately radial inward acceleration of ionized gases contained therein.

8. The spherical fusion reactor of claim 7 wherein the radial inward acceleration of ionized gases provides for ions impacting the spherical target, for the impact of ions with one another, and for such impacts to occur at fusion reactive velocities.

9. The spherical fusion reactor of claim 7 wherein the radial outward acceleration of ionized gases provides for a period of time during operation in which gas distribution allows for gas exchange.

10. The spherical fusion reactor of claim 1 wherein the fusion reactive gas is composed of the following gases: fusion reactive isotopes of Hydrogen or Helium, singularly or combination.

11. The spherical fusion reactor of claim 1 wherein the spherical shell of insulating material provides for the following: a sealed space containing gas at a predetermined pressure, an insulating surface providing a location for the stopping of the outward movement of electrons, a location of a equipotential of electric charge accumulation, and the development of a spherically symmetrical electric field.

12. The spherical fusion reactor of claim 1 wherein the fusion reactive gas is at a predetermined pressure from about 0.0001 to about 0.1 Torr.

13. The spherical fusion reactor of claim 1 wherein the insulating and cooling medium separates and distances RF, radio frequency, ground potential from locations: within the reactor chamber, along the inner surface of the reactor chamber, along the outer surface of the reactor chamber, and to places external to the thermally and electrically insulated enclosure.

14. The spherical fusion reactor of claim 13 wherein the separation and distancing of RF ground potential provides for: a symmetrically developed field within the reactor, an electric field of evenly developed intensity radially outward from the target to the ground plane, the prevention of internal arcing, and the reduction of capacitive reactance loading of the power supply.

15. The spherical fusion reactor of claim 1 wherein the high voltage, high frequency AC potential provided by the power supply is at a predetermined voltage from 100,000 volts AC RMS, root mean square to 500,000 volts AC RMS.

16. The spherical fusion reactor of claim 1 wherein the high voltage, high frequency AC potential provided by the power supply is at a predetermined frequency from 20,000 Hertz to 100,000 Hertz.

17. The spherical fusion reactor of claim 1 wherein the thermally and electrically insulated enclosure provides for the electrical isolation of RF ground potential to a location external to the space enclosed by said thermally and electrically insulated enclosure.

18. The spherical fusion reactor of claim 1 wherein the thermally and electrically insulated enclosure provides for: the outward passage of particulate and waveform radiations, and the restriction of the inward passage of thermal energy from the surrounding radiation absorbing and cooling medium.

19. The spherical fusion reactor of claim 1 wherein the absorbing and cooling medium provides for the absorption of emitted radiations released by the fusion reactor.

20. The spherical fusion reactor of claim 19 wherein the absorption of emitted radiations released by the reactor provides for: the harnessing of said radiations to do work, the shielding of the external environment of the reactor from radiations, and the cooling of the contained reactor and it's associated internal components.

* * * * *